United States Patent [19]

Hammer et al.

[11] Patent Number: 4,666,750
[45] Date of Patent: May 19, 1987

[54] ARTIFICIAL SAUSAGE CASING

[75] Inventors: Klaus-Dieter Hammer, Mainz; Manfred Siebrecht, Weisbaden-Naurod; Hermann Winter, Wiesbaden-Biebrich, all of Fed. Rep. of Germany

[73] Assignee: Hoechst Aktiengesellschaft, Frankfurt am Main, Fed. Rep. of Germany

[21] Appl. No.: 833,041

[22] Filed: Feb. 26, 1986

[30] Foreign Application Priority Data

Mar. 1, 1985 [DE] Fed. Rep. of Germany ... 8505880[U]

[51] Int. Cl.$^4$ ............................................. A22C 13/00
[52] U.S. Cl. .................................. 428/36; 138/118.1; 426/105; 426/135
[58] Field of Search ..................... 428/36; 138/118.1; 426/105, 135

[56] References Cited

U.S. PATENT DOCUMENTS

| 3,539,361 | 11/1970 | Coleman | 138/118.1 |
| 3,617,312 | 11/1971 | Rose | 138/118.1 |
| 4,142,013 | 2/1979 | Hammer et al. | 138/118.1 |
| 4,524,634 | 7/1985 | Hammer et al. | 138/118.1 |

Primary Examiner—John E. Kittle
Assistant Examiner—James J. Seidleck
Attorney, Agent, or Firm—Schwartz, Jeffery, Schwaab, Mack, Blumenthal & Evans

[57] ABSTRACT

Disclosed is an artificial sausage casing comprising a fiber-reinforced, cellulose-based support tubing and a coating layer applied to the outer surface of the support tubing. The external coating layer comprises a casein crosslinked with glyoxal, and having sorbic acid radicals bonded by a salt-like linkage. The amount of casein in the external coating layer ranges from about 80 to 150 mg/m$^2$, particularly from about 100 to 130 mg/m$^2$. In a preferred embodiment, the inside surface of the support tubing is provided with a coating layer which serves either to improve the peelability and/or the adhesion between sausage meat and sausage casing or to provide compactness and gas-tightness.

12 Claims, 2 Drawing Figures

ARTIFICIAL SAUSAGE CASING

BACKGROUND OF THE INVENTION

The present invention relates to an artificial sausage casing comprising a cellulose-based support tubing which is provided with an external coating layer.

Uncooked sausage, for example, long-life sausage, dry sausage or salami, is preserved by smoking or air-drying, as is known. In the air-dry process, special mold fungi are cultivated on the outer surfaces of the stuffed sausage casings, and the sausages are preserved by air-drying for weeks or even for months. However, the long storage periods give rise to problems. In the course of time, for example, the mold fungi secrete cellulytic enzymes, in particular cellulases, which gradually decompose the cellulose material of the sausage casing. As a result, the casing becomes brittle and fragile and can no longer be peeled from the sausage meat in one piece.

It is known to provide the cellulose-based support tubing with a polymeric coating (German Offenlegungsschrift No. 32 27 920) to improve the resistance of the cellulose casing to this undesirable decomposition by cellulytic enzymes. These sausage casings are, however, not sufficiently protected from the formation of an undesirable mold prior to the processing thereof.

In fact, there is frequently the additional problem that the artificial sausage casing is attacked by undesirable mold fungi and other microorganisms while it is stored before being stuffed with sausage meat. These mold fungi grow particularly fast if the artificial sausage casing is stored with a high moisture content before it is processed.

To prevent this effect, it is known to apply a fungicide to the outside surface of the support tubing (German Offenlegungsschrift No. 33 28 947). A conventional fungicide is, for example, potassium sorbate which is anchored to the outside of the cellulose casing in a surface layer comprising a polymeric cationic resin (German Offenlegungsschrift No. 32 40 847) or crosslinked gelatin (U.S. Pat. No. 3,617,312). The external surface layers of these prior art cellulose-based sausage casings, however, do not produce sufficient resistance of the casings to the decomposition of cellulose by cellulytic enzymes.

SUMMARY OF THE INVENTION

It is, therefore, an object of the present invention to provide a sausage casing comprising a fiber-reinforced, cellulose-based support tubing, which can be stored in a moist state before and after processing, which is simultaneously resistant to attack by undesirable mold fungi and to decomposition by cellulytic enzymes.

Another object of the present invention is to provide a sausage product which comprises a sausage material and a sausage casing which is resistant to attack by undesirable mold fungi and to decomposition by cellulytic enzymes.

A further object of the present invention is to provide an acidic solution which can form an external coating layer for a cellulose support tubing, which comprises casein, glyoxal and potassium sorbate.

In accomplishing these objects, there is provided in accordance with one aspect of the present invention an artificial sausage casing comprising a fiber-reinforced cellulose-based support tubing and a coating layer, having a weight per unit area ranging from about 80 to 200 mg/m$^2$, applied to the outer surface of the support tubing, wherein the external coating layer comprises a casein which is crosslinked with glyoxal and which has sorbic acid radicals bonded by a salt-like linkage. Preferably, the weight per unit area of the external coating layer is between about 130 and 180 mg/m$^2$.

In another preferred embodiment, the sausage casing is further provided with a coating layer applied to the inner surface of the support tubing. The inner coating layer preferably comprises an adhesion-promoting and peeling-improving material or a compact, gas-tight surface layer.

In accordance with another aspect of the present invention there is provided an acidic solution for forming the external coating layer of the cellulose support tubing which comprises casein, glyoxal and potassium sorbate. Preferably the acidic solution comprises from about 0.5 to 8% by weight of the casein, based on the total weight of the solution, about 0.5 to 5% by weight of the glyoxal, based on the weight of the casein, and about 10 to 40% by weight of the potassium sorbate, based on the weight of the casein. Most preferably, the acidic solution comprises from about 1 to 7% by weight of casein, about 0.8 to 2.5% by weight of the glyoxal, and about 20 to 35% by weight of the potassium sorbate.

The acidic solution is advantageously a weakly acidic solution having a pH in the range from about 4 to 6.7, and more preferably between about 5 and 6.5.

In accordance with still another aspect of the present invention there is provided a sausage product which comprises a sausage material and an artificial sausage casing as described above.

Other objects, features and advantages of the present invention will become more apparent upon a review of the detailed description of preferred embodiments which follows, when considered in view of the figures and drawing.

DETAILED DESCRIPTION OF THE PREFERRED EMBODIMENTS

Figure 1:
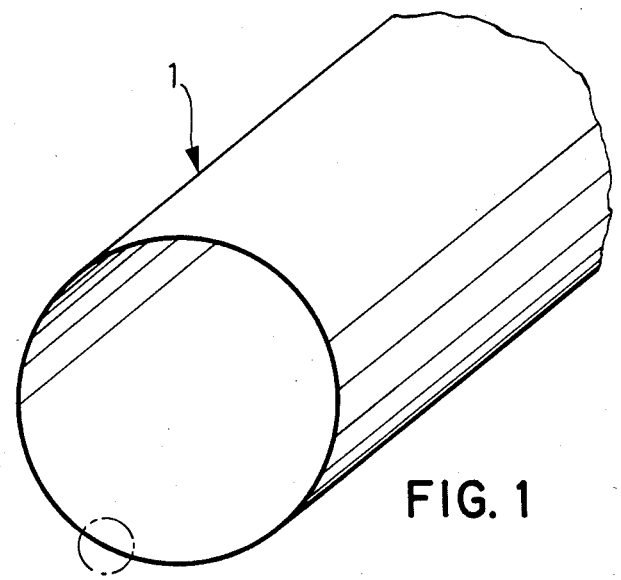
FIG. 1 is a sectional view of the sausage casing according to the present invention.

The sausage casing of the present invention comprises a fiber-reinforced, cellulose-based support tubing and a coating layer.

The coating layer comprises casein as the main component. The casein primarily forms a protective layer in the form of a compact film, which prevents the cellulytic enzymes from penetrating into the support tubing. By crosslinking with glyoxal, the casein is firmly bonded to the cellulose layer. A coating of pure casein may also form a protective layer against the attack by cellulytic enzymes; however, a layer of this composition is not sufficiently resistant to boiling. The action of the external coating layer can be increased by additional fungicidal agents, in particular, glycerol monolaurate.

The amount of casein applied is determined by mechanically scraping off the coating layer and determining the nitrogen according to the Kjeldahl method. The amount of sorbic acid is determined by hydrolytic action of sodium hydroxide solution and measuring with an ultraviolet spectrometer (measured value at 260 nm).

The amount of glycerol monolaurate is gravimetrically determined after dissolving with methylene chloride.

For the production of the sausage casing of the present invention, the known viscous process is employed. The viscose optionally contains pigments, for example, titanium dioxide particles, which are required to provide a white or colored sausage casing. Preferably, the viscose is applied to both surfaces of a fiber insert, particularly a paper insert, which has been shaped into a tubing. The quantities of viscose applied to the two surfaces of the fibrous tubing to form the internal and external cellulose layers may be different, such that the layers of regenerated cellulose produced have different thicknesses. In general, the weight ratio between the external and internal viscose layers may be in the range from about 6:4 to 2:8.

The viscose-coated fiber or paper tubing is then treated with coagulating and regenerating liquids, as is known in the art. The tubing of fiber-reinforced cellulose hydrate gel thus obtined is coated on its outside with an aqueous, weakly acidic solution comprising casein, glyoxal and potassium sorbate. A "weakly acidic solution" refers to a solution having a pH from about 4 to 6.7, particularly from about 5 to 6.5. The amount of casein ranges from about 0.5 to 8% by weight, particularly from about 1 to 5% by weight, based on the solution. The amount of glyoxal ranges from about 0.5 to 7% by weight, particularly from about 1 to 3% by weight, based on the amount of casein used. The optimum amount of potassium sorbate ranges from about 10 to 40% by weight, particularly from about 20 to 35% by weight, based on the amount of casein used. Optionally, the solution additionally contains from 1 to 3% by weight of glycerol monolaurate.

It is moreover appropriate to admix the aqueous solution with a suitable plasticizer, especially glycerol, in a customary concentration. A special plasticizer bath can thus be eliminated. The aqueous solution partly penetrates into the cellulose material of the support tubing.

The aqueous solution is applied in a manner known per se, for example, by impregnating or coating with the aid of rollers, doctor blades or spray nozzles. The crosslinking reaction occurs in a subsequent heating procedure at about 60° C. to 110° C. In this procedure, the casein is anchored to the cellulose layer by crosslinking with the glyoxal. The anchored layer is thus resistant to boiling. Also, the sorbic acid, already in the weakly acid solution, is bonded to amino and imino groups of the casein by a salt-like linkage.

Due to the low dissociation constant, the casein-sorbic acid salt withstands the boiling process almost quantitatively and is then hydrolytically released on the casing, in the quantity which corresponds to the equilibrium. In this manner, a storage effect is obtained. When the free sorbic acid, which alone acts as a fungicide, has been used up by mold spores, fresh sorbic acid is again formed from the casein-sorbic acid salt.

After drying, during which the casein has been crosslinked, the inside of the tubing is optionally coated with a customarily employed dispersion of a water-soluble synthetic resin to produce an internal coating layer. By removing the dispersing agent and heating, an internal coating comprising the synthetic resin is formed. Thereafter, the sausage casing is moistened to the usual water content and is either processed into individual lengths of sausage casing, which are tied at one end, or is gathered into shirred sticks.

By means of this external coating layer which can be produced by a technically easy process, using inexpensive substances which are safe from the point of view of food laws, the resistance to cellulases and mold is enhanced in cellulose-based sausage casings. As a side effect, the casing surface is modified to have a satin finish and a good feel, which positively influences shirring and stuffing of the sausage casing.

The invention is explained in detail by the following examples:

EXAMPLE 1

Before entering the dryer, a fiber-reinforced tubing of cellulose hydrate gel having a diameter of 60 mm, which has been coated with viscose on both sides and then treated with regenerating fluid, is passed through an aqueous solution (pH 5.5) of the following composition:

20 g/l of casein,
40 m/l of glycerol,
1.7 ml/l of a 40% strength glyoxal and
30 ml/l of a 15% strength potassium sorbate solution
670 ml/l of a 3% strength glycerol monolaurate emulsion Quantity applied:
80 mg/m² of casein,
140 mg/m² of glycerol monolaurate During this external coating procedure, the tubing is simultaneously coated on the inside with a customary anchoring solution based on a thermosetting cationic resin, which has been filled into the tubing. The coated tubing is dried in the inflated state, the external and internal coating layers being crosslinked and/or cured in the process. The tubing is then coated on the inside with a dispersion comprising a vinylidene chloride copolymer and is thereafter again heated, thereby forming a compact, gas-tight internal coating layer.

The sausage casings which have been tied at one end are stuffed with liver sausage emulsion and the open end is closed. The sausages are boiled in the usual manner. After cooling, the sausages are tested for the fungicidal effect of the external coating layer by inoculating with mold spores and sealing in a polyethylene bag. After storing for any length of time, these sausages do not show any growth of mold.

EXAMPLE 2

A fiber-reinforced cellulose hydrate tubing which has been viscose-coated on both sides and which has a diameter of 58 mm is, in the gel state, i.e., after coagulating and regenerating the viscose and before introducing the tubing into the dryer, passed through an aqueous solution (pH 5.2) of the following composition:

30 g/l of casein,
40 ml/l of glycerol,
1.5 ml/l of a 40% strength glyoxal and
100 ml/l of a 15% strength potassium sorbate solution.

Quantity applied: 120 mg/m².

During this external coating procedure, the tubing is simultaneously coated on the inside with a solution based on an epichlorohydrin-polyamide polyamine resin, which has been filled into the tubing and is customarily employed for improving the adhesion between sausage meat and casing. The tubing is then dried in the inflated state, then, as is usual, remoistened to a moisture content of 10% by weight and processed into sausage casing lengths which are tied at one end. These casings are stuffed with a sausage meat for the production of long-life sausages. After tying the open ends of the casings, the sausages are inoculated with special mold spores (penicillium nalgiovense) on the outside of the sausage casings and stored under the usual air-dry conditions. After a storage period of three months, these sausages do not show any attack by cellulases. The casings can be peeled from the sausage meat without tearing or breaking.

Figure 1A:
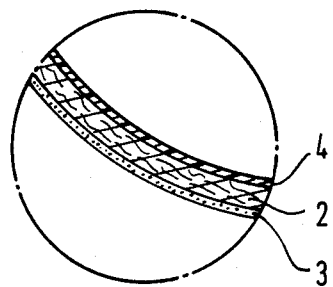
FIG. 1a is an enlarged sectional view showing a portion of the casing wall of the sausage casing of FIG. 1.

FIG. 1 shows the sausage casing 1 in a sectional view. FIG. 1a shows a portion of the casing wall in an enlarged sectional view. The casing wall comprises a fiber-reinforced support tubing 2, an external, compact coating layer 3 comprising a cross-linked casein-sorbic acid salt, and an internal coating layer 4.

What is claimed is:

1. An artificial sausage casing, comprising a fiber-reinforced, cellulose-based support tubing and a coating layer applied to the outer surface of said support tubing, wherein said external coating layer comprises a casein which is crosslinked with glyoxal and which has sorbic acid radicals bonded by a salt-like linkage, the amount of casein in the external coating layer being from 80 to 150 mg/m² and the amount of sorbic acid from 10 to 40% by weight, based on casein.

2. An artificial sausage casing as claimed in claim 1, wherein the amount of casein is between about 100 and 130 mg/m².

3. An artificial sausage casing as claimed in claim 1, further comprising a coating layer applied to the inner surface of said support tubing.

4. An artificial sausage casing as claimed in claim 3, wherein said inner coating layer comprises a compact, gas-tight surface layer.

5. An artificial sausage casing as claimed in claim 3, wherein said inner coating layer comprises an adhesion promoting and peeling improving surface layer.

6. An artificial sausage casing as claimed in claim 5, wherein said inner surface layer comprises an epichlorohydrin-polyamide polyamine resin.

7. An artificial sausage casing as claimed in claim 1, wherein said external coating layer is produced from a weakly acidic solution comprising casein, glyoxal and potassium sorbate.

8. An artificial sausage casing as claimed in claim 7, wherein said weakly acidic solution comprises from about 0.5 to 8% by weight of said casein, based on the total weight of the solution, about 0.5 to 7% by weight of said glyoxal, based on the weight of said casein, and about 10 to 40% by weight of said potassium sorbate, based on the weight of said casein.

9. An artificial sausage casing as claimed in claim 7, wherein said weakly acidic solution comprises from about 1 to 5% by weight of casein, based on the total weight of the solution, about 1 to 3% by weight of said glyoxal, based on the weight of said casein, and about 20 to 35% by weight of said potassium sorbate, based on the weight of said casein.

10. An artificial sausage casing as claimed in claim 7, wherein the pH of said weakly acidic solution is in the range of from about 4 and 6.7.

11. An artificial sausage casing as claimed in claim 10, wherein the pH of said weakly acidic solution is in the range from about 5 to 6.5.

12. A sausage product, comprising a sausage material and an artificial sausage casing as defined in claim 1.

* * * * *